(12) United States Patent
Rudolph et al.

(10) Patent No.: US 8,903,226 B2
(45) Date of Patent: *Dec. 2, 2014

(54) APPARATUS FOR RESOLVING RECORDING TIMER CONFLICTS

(75) Inventors: Daniel L. Rudolph, Castle Rock, CO (US); Daniel J. Minnick, Littleton, CO (US); David A. Kummer, Highlands Ranch, CO (US); Wendell R. Blackman, Denver, CO (US); Brent Tinker, Littleton, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 1175 days.

This patent is subject to a terminal disclaimer.

(21) Appl. No.: 12/437,758

(22) Filed: May 8, 2009

(65) Prior Publication Data

US 2009/0263101 A1    Oct. 22, 2009

Related U.S. Application Data

(63) Continuation of application No. 10/935,990, filed on Sep. 7, 2004, now Pat. No. 7,558,469.

(60) Provisional application No. 60/608,939, filed on Sep. 5, 2003.

(51) Int. Cl.
| | | |
|---|---|---|
| H04N 5/76 | (2006.01) | |
| H04N 21/4623 | (2011.01) | |
| H04N 5/782 | (2006.01) | |
| H04N 21/4147 | (2011.01) | |
| H04N 5/781 | (2006.01) | |
| H04N 9/804 | (2006.01) | |
| H04N 5/765 | (2006.01) | |
| H04N 5/775 | (2006.01) | |

(52) U.S. Cl.
CPC ........... *H04N 5/782* (2013.01); *H04N 21/4623* (2013.01); *H04N 5/781* (2013.01); *H04N 9/8042* (2013.01); *H04N 5/765* (2013.01); *H04N 21/4147* (2013.01); *H04N 5/775* (2013.01)
USPC ........... 386/291; 386/292; 386/293; 386/294; 386/295; 386/296; 386/297; 386/298

(58) Field of Classification Search
USPC .................................................. 386/291–298
See application file for complete search history.

(56) References Cited

U.S. PATENT DOCUMENTS

| | | | |
|---|---|---|---|
| 4,799,056 A | 1/1989 | Hattori et al. | |
| 5,021,974 A | 6/1991 | Pisculli et al. | |
| 7,218,839 B2* | 5/2007 | Plourde et al. | 386/291 |
| 7,224,886 B2* | 5/2007 | Akamatsu et al. | 386/291 |
| 7,603,688 B2* | 10/2009 | DeYonker et al. | 725/58 |
| 7,787,750 B2* | 8/2010 | Kondo et al. | 386/291 |
| 2002/0191954 A1 | 12/2002 | Beach et al. | |

(Continued)

OTHER PUBLICATIONS

Taxier, et al, U.S. Appl. No. 12/235,464, filed Sep. 22, 2008, entitled "Methods and Apparatus for Visually Displaying Recording Timer Information".

*Primary Examiner* — Helen Shibru
(74) *Attorney, Agent, or Firm* — Ingrassia Fisher & Lorenz, P.C.

(57) ABSTRACT

Described herein are techniques for displaying conflicts between two or more recording timers. Recording conflicts are displayed graphically for the user to resolve.

19 Claims, 9 Drawing Sheets

(56) References Cited

U.S. PATENT DOCUMENTS

| | | | |
|---|---|---|---|
| 2004/0103434 A1* | 5/2004 | Ellis | 725/58 |
| 2004/0250280 A1 | 12/2004 | Allport | |
| 2006/0037048 A1* | 2/2006 | DeYonker et al. | 725/58 |
| 2006/0179462 A1* | 8/2006 | Willame et al. | 725/90 |
| 2007/0039021 A1 | 2/2007 | Lee | |
| 2007/0277198 A1 | 11/2007 | Yasukawa et al. | |
| 2008/0205847 A1 | 8/2008 | Yanagita et al. | |

* cited by examiner

APPARATUS FOR RESOLVING RECORDING TIMER CONFLICTS

RELATED APPLICATIONS

This application is a continuation of U.S. patent application Ser. No. 10/935,990, entitled 'Method and Apparatus To Display Graphically Recording Timer Conflicts", filed Sep. 7, 2004, which is hereby incorporated by reference in its entirety. This application also claims priority to patent application Ser. No. 10/655,636, filed Sep. 5, 2003, entitled "Method and Apparatus To Display Graphically Recording Timer Conflicts", which application was converted to Provisional Application Ser. No. 60/608,939, under 37 C.F.R. §1.53(c)(2) on Nov. 29, 2004.

FIELD ON THE INVENTION

The present invention relates to television converter devices for receiving and recording channels of television programming. More particularly, the invention relates to a method and apparatus for displaying graphically and resolving conflicts between recording timers.

BACKGROUND OF THE INVENTION

The prior art includes various devices which may be used to record television programs. Most common may be VCRs, which can record television programs. More recently, devices known as personal video recorders (PVRs) have entered the market. PVRs use a hard drive to record digital data which may include, but is not limited to, a television program. Various optical media and other forms of memory may be used to record television programs or digital representations thereof.

The aforementioned television converter devices may be used to automatically record programs that will occur in the future. For VCRs, one may input the channel, time, and duration of a program to be recorded. This may be referred to as the manual setting of a timer. Newer PVR devices may allow a user to select a television program to be recorded from an electronic program guide (EPG). An EPG is a display of program and schedule information on the television screen. Such information may be broadcast to the television converter device, and may be periodically updated. Advanced EPGs may allow users to highlight particular programs. If selected, by pressing the proper button on a remote control, a highlighted program may be selected for either watching or recording depending on the situation.

Some advanced PVRs allow the user to set several different timers for several different programs. Another feature of some prior art PVRs is to announce conflicts between timers. The user may then resolve the conflict by effectively choosing one of the timers.

Prior art PVRs may announce a timer conflict by presenting the user with a text-based message that describes the timer conflict. The messages may include the titles of the programs, the time the programs were supposed to be recorded, and the channels. The user may need to read this information, determine why there is a conflict, and decide how to resolve the conflict. In essence, the text-based messages may force the user to decipher what caused the timer conflict.

Prior art devices do not provide for a graphical display of the conflict between the timers. Thus, prior art devices do not provide a user-friendly, graphical interface to resolve timer conflicts. These and other deficiencies of the prior art are overcome by the present invention.

Figure 1:
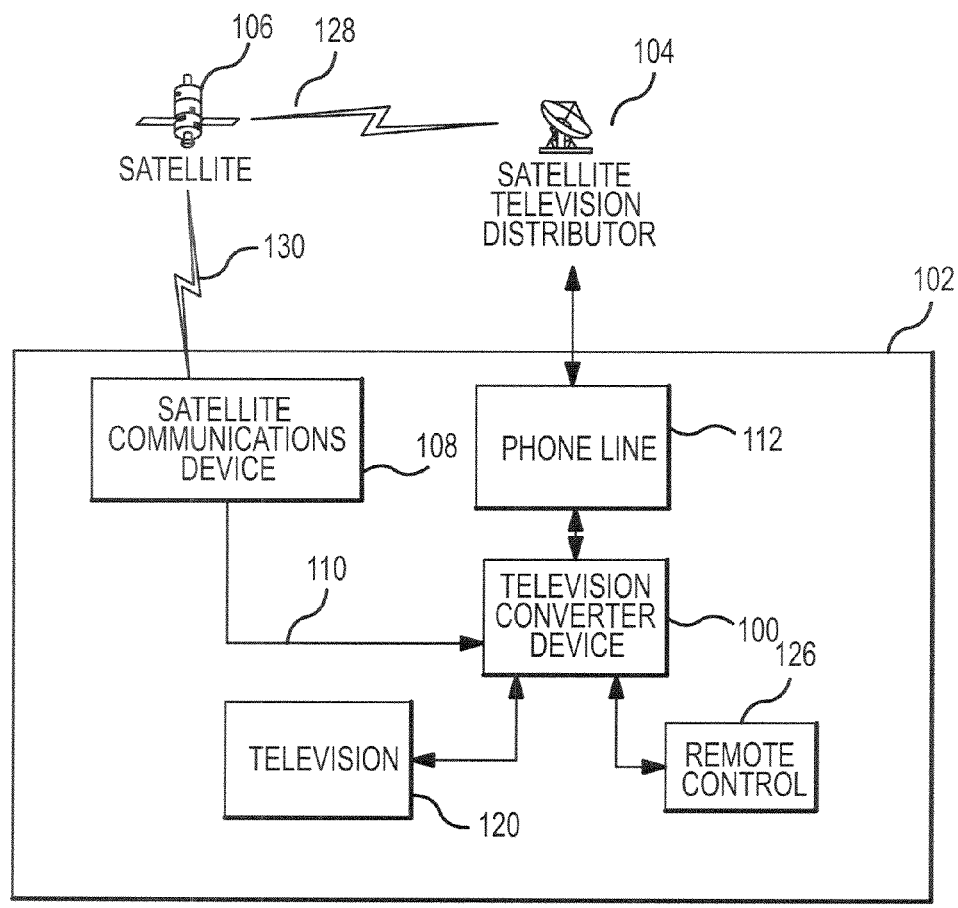
FIG. 1 illustrates a home entertainment system utilizing a television converter device in accordance with an embodiment of the present invention.

For clarification, the drawings use a nomenclature for reference numerals that has two parts. The first part of the reference numeral is the drawing number, and it is followed by the second part, a two digit identifier (drawing 1 uses 1xx; drawing 3 uses 3xx). For example, two reference numerals in drawing 1 may be "102" and "104." A reference numeral in one drawing may be referred to in subsequent drawings; the same reference numeral in later drawings refers to the same item.

DETAILED DESCRIPTION OF THE INVENTION

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recording (DVR) devices. The present invention may also be applicable to digital-versatile-disc (DVD) recording devices or other television converter devices. One skilled in the art will recognize that the present invention can apply elsewhere.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "set-top-box," "television converter device," "television converter," "television converter device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. "Digital video recorder (DVR)" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, Internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and PVR. For the remainder of this disclosure, specific embodiments will be described using a television converter device that implements satellite technology.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity.

Thus, in satellite television service a channel may not be the same as in broadcast television service. Rather, channels may be more properly termed service providers in satellite television service. The term "channel" will be used in this description to describe the service providers and the virtual channels they may occupy.

FIG. 1 presents an embodiment of a home entertainment system 102 that includes a television converter device 100 in the form of a satellite set-top-box. Generally, the satellite set-top-box 100 may receive one or more television signals from a cable television distributor (not shown), from a broadcast television distributor (not shown) or from a satellite television distributor 104. As a preferred embodiment, home entertainment system 102 receives signals from satellite television distributor 104. One skilled in the art will recognize that set-top-box 100 may also receive video-digital subscriber line (DSL), DSL, Internet, wireless and other signals from content or video distributors. The satellite set-top-box 100 may process television signals and may send the processed signals to peripheral electronic devices, such as a monitor or television 120. The satellite set-top-box 100 also may accept commands from a remote control 126 or other peripheral electronic devices. More detail about the functionality of the satellite set-top-box 100 is provided below.

To further describe the home entertainment system, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 Mhz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite set-top-box 100 may be possible.

Figure 2:
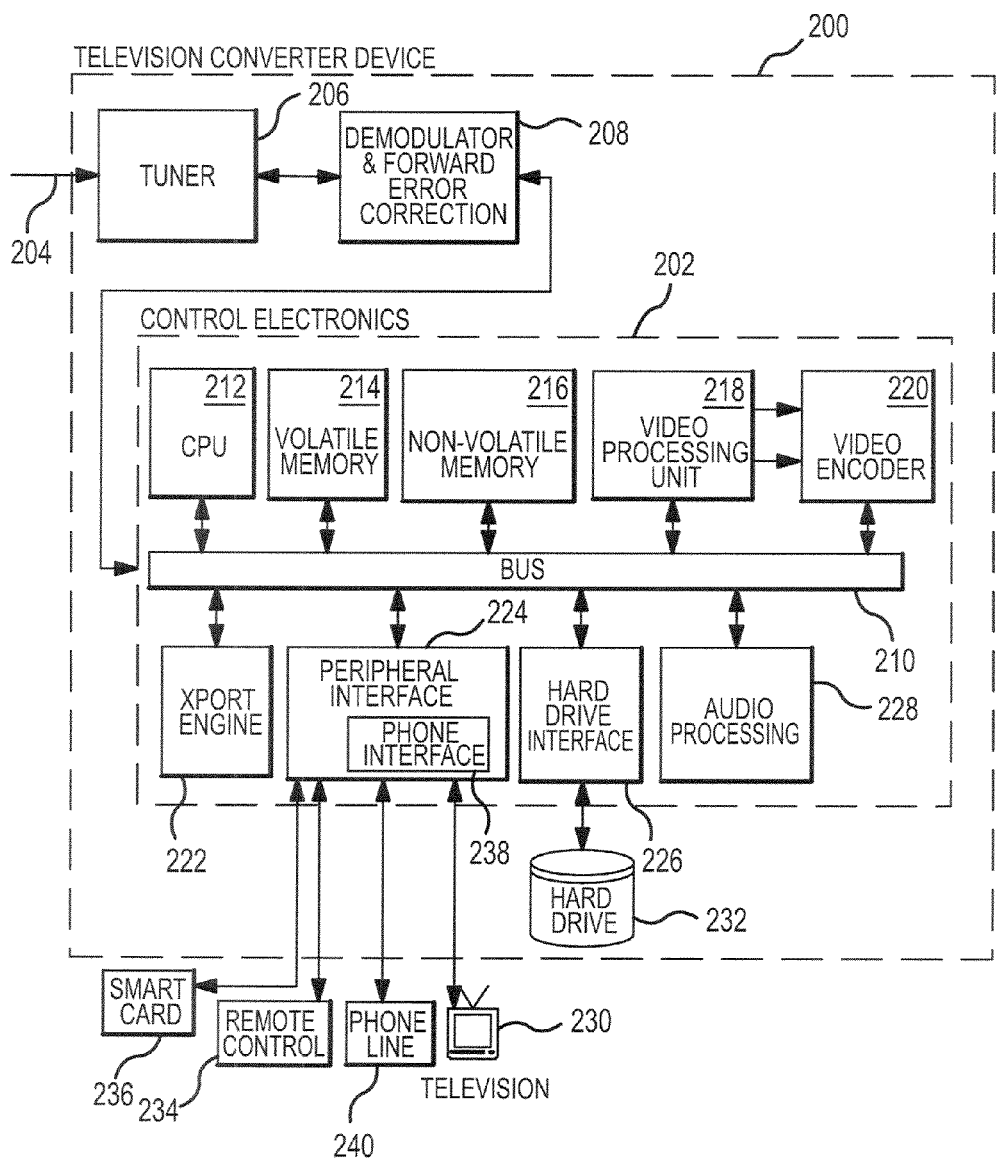
FIG. 2 illustrates a functional block diagram of the logical elements of an embodiment of a television converter device in accordance with the present invention.

FIG. 2 provides a high level block diagram for the satellite television converter device 100, 200 with DVR functionality in accordance with the present invention.

The signal 110, 204 that arrives at the satellite set top box 200 may undergo extensive processing. The television converter 200 may include one or more tuner devices 206 that may receive a satellite signal 204. In this embodiment, tuner device 206 acquires a satellite signal 204 from satellite television distributor 104. Tuner device 206 may initially process the satellite signal 204. Tuner device 206 may also receive subscriber commands in the form of signals from control electronics unit 202. Signals from control electronics unit 202 may include, but is not limited to, a signal to tune to a transponder as part of the process of selecting a certain channel for viewing on a peripheral device. One skilled in the art would recognize that the tuner device 206 may include fewer, more, or different components.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error-checking. Forward error-checking (FEC) 208 may include, but is not limited to, inspecting parity bit or bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In this embodiment, satellite set-top-box 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In a preferred embodiment, control electronics unit 202 includes discrete electronic components combined into a single circuit with a shared bus 210. In other embodiments, control electronics unit 202 may be configured differently. For example, one or more of the control electronics unit 202 components in set-top-box 200 may be combined or omitted. The control electronics unit 202 may use a custom ASIC, such as from the LSILogic G11 family, or FPGA, such as from the Altera Stratix™ family. As a further example, one or more of the control electronics unit 202 components in set-top-box 200 may not share a bus 210, but may nonetheless be operatively connected by some other means. One skilled in the art will recognize that other configurations of set-top-box 200 and control electronics unit 202 are possible and within the scope of this invention. One skilled in the art will further recognize that some components of set-top-box 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUs) 212 or processors. A preferred embodiment of control electronics unit 202 contains a single CPU 212 that is operatively connected to the shared bus. In one embodiment, CPU 212 may be used, among other things, for logical operations for set-top-box 200 functions including, but not limited to, channel selection, recording control, EPG display and control and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may also contain one or more volatile memory components 214. Volatile memory components 214 may include, but are not limited to, one or more SDRAM memory chips. Similarly, control electronics unit 202 may contain non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within set-top-box 200 and control electronics unit 202. One skilled in the art will recognize that memory 214, 216 may be used for many purposes, including, but not limited to, storing EPG data and storing data for use by CPU 212.

In a preferred embodiment, signal 204 is in digital form (e.g., a digital stream) after demodulation and error correction. For example, digital stream 204 may use, but is not limited to using, the digital video broadcasting (DVB) transport standard. The digital stream 204 may be multiplexed and therefore require demultiplexing by XPORT Engine 222. Demultiplexing 222, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG or MPEG2 standards. Beyond the raw data, the separate digital data streams may include forward error correction, headers, checksums, or other information. All of this different information may be included in the digital television signal 204 processed by the satellite set-top-box 100. Control electronics unit 202 may therefore include one or more video processing units 218 that, among other video processing operations, may decode encoded signal 204. In a preferred embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, antialiasing, antiflutter and antiflicker filters, memory and video-rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. As a preferred embodiment, video encoder 220 may translate digital stream into a signal using the NTSC, PAL or SECAM standards. One skilled in the art will recognize that video encoder unit 220 may include other functionality, may be integrated into other electronic components of satellite set-top-box 200, and may encode digital stream 204 using other standards, including, but not limited to, MPEG and MPEG2.

Control electronics unit 202 may also include one or more hard drive interfaces 226 and hard drives 232. In a preferred embodiment, television converter device 200 contains one hard drive interface 226 and hard drive 232. Hard drive 232 may be used for many purposes, including, but not limited to, storing recorded programs, buffering currently-playing programs (e.g., buffering a program may allow a user to pause or rewind a program), storing EPG data, storing commands or functions for the control electronics unit 202, storing timers or record events, and storing data for other devices within or connected to the satellite set-top-box 200. As another example, hard drive 232 may be used to temporarily store data for processing by CPU 212. In this example, the hard drive 232 may allow the processor 212 to separate EPG data arriving as part of digital stream 208. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite set-top-box 200. For example, an external hard drive 232 may be connected to satellite set-top-box 200 using USB 2.0 or IEEE 1394 (FireWire) connections. Such an external hard drive may include a screen for portable viewing of programming stored on it.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital to audio converter (DAC) systems. One skilled in the art will recognize that other audio processing components and functionality may be accomplished using audio processing unit 228.

A satellite set-top-box 200 may be connected to one or more peripheral electronic devices through peripheral interface 224. These peripheral devices may include a stereo (not shown), television 230, smart card 236, VCR (not shown), or other devices. In a preferred embodiment, home entertainment system 102 minimally contains, but is not limited to, a television 230 and smart card 236. Television 230 may serve many purposes, including, but not limited to, displaying television programming, displaying the EPG, displaying timer conflicts, and displaying other types of data, graphics and programming. Peripheral devices may receive and/or send signals from the satellite set-top-box 200. For instance, the television 230 may receive video and audio signals and a stereo may receive only audio signals. A camcorder (not shown), on the other hand, may send video or audio signals to the satellite set-top-box 100 or receive audio and video signals from the set-top-box to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

The home entertainment system 102 may also include a remote control 126, 234 peripheral device, also sometimes referred to as a remote. The remote control 234 may be used to send commands to the satellite set-top-box 200. The remote control 234 may send commands via a wireless connection using, for example, infrared or UHF transmitters within the remote control 234. One example of an embodiment of a remote controller 234 is the EchoStar Technologies Corporation 721 Platinum Plus Remote, Part Number 121150, that includes an IR transmitter and an ultra high frequency (UHF) transmitter. The remote control 234 may be able to send signals to other peripheral electronic devices that form part of the home entertainment system 102, including, but not limited to, a television, stereo, VCR, or DVD player. The set-top-box 200 may also be able to send signals to the remote control 234, including, but not limited to, signals to configure the remote control 234 to operate other peripheral devices in home entertainment system 102. In some embodiments, the remote control 234 has a set of Light Emitting Diodes (LEDs). Some remote controls may include Liquid Crystal Displays (LCDs) or other screens. The remote control may include buttons, dials, or other man-machine interfaces. While the remote control 234 may often be the common means for a subscriber to communicate with the satellite set-top-box 200, one skilled in the art will recognize that other means of communicating with the set-top-box 200 are available, including, but not limited to attached keyboards, front panel buttons or touch screens.

The satellite set-top-box 200 may also include a remote control interface (not shown). A remote control interface may include any means for the user to communicate to the satellite set-top-box 200, and may be implemented using the peripheral interface 224 of control electronics unit 202 or by connecting a peripheral remote control interface device. In a preferred embodiment, a remote control interface may receive commands from one or more different remote controls 234. Remote control 234 may use infrared, UHF, or other communications technology. The remote control interface may therefore translate an input from the user into a format understandable by the control electronics unit 202. The translation systems may include, but are not limited to, electronic receivers and electronic relays. One skilled in the art will recognize that other means to receive and translate user inputs are possible.

Another peripheral device and connection to the satellite set-top-box 200 may include a phone interface 238, phone line 112, 240 and modem (not shown). Set-top-box 200 may use a modem and phone line 240 to communicate with one or more outside entities or systems (e.g., satellite television distributor 104). The phone line 240 may carry local or long-distance telephone service. One skilled in the art will recognize that the phone line 240 may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite set-top-box 100. For example, the phone line 240 may communicate with the satellite set-top-box 100 using an RJ-11 style telephone connection. One skilled in the art will recognize that there are many other uses for this phone line connection 240. For example, EPG data may be transmitted to set-top-box 200 via phone line 240 or in the satellite signal 204. One skilled in the art will recognize that the EPG data may be transmitted to set-top-box 200 by various other methods, systems and outside entities. Also, one skilled in the art will recognize that a phone line connection 240 to satellite distributor 104 may represent other communication connections, including, but not limited to, wireless, Internet, or microwave communications connections. Another function of the phone line 240 may be to periodically receive the EPG data. As set forth below, the EPG data can be used by the satellite set-top-box 200 to construct the timer conflict graphics.

In one embodiment of the invention, a user may send a record command to the satellite set-top-box 200 via a remote control 234. The satellite set-top-box 200 may store a timer related to the record command in hard drive 232. Before recording the episode of the program, the satellite set-top-box 200 may use EPG data provided by the phone line 240 or the satellite signal 204 to update the timer. Then, the satellite set-top-box 200 may select a channel of television programming in the satellite signal 204. The television converter device 200 may then record an episode of the program to hard drive 232. Then, upon request by the user via the remote control 234, the satellite set-top-box 200 may send the recorded program to television 230.

In another embodiment, the control electronics 202 may receive a record command via the peripheral interface 224 to the remote control 234. The record request may command the satellite set-top-box 200 to record a program. The control electronics 202 may then create a timer and store the timer in the storage device 232. Then, the control electronics unit 202 may receive a second record command. The control electronics unit 202 may then determine if the two timers will record a program or part of a program at the same time. To determine if the timers must record simultaneously, the control electronics unit 202 may look up the programs in the EPG data or compare the preexisting timer with the one that would be created by the second record command. If the programs are scheduled to record at the same timer, the control electronics unit 202 may create a graphical display showing the timer conflict.

The graphical displays showing timer conflicts, as set forth in FIGS. 3, 4, 5, 6, and 7, for example, may be created using components in satellite set-top-box 200, including, but not limited to, control electronics unit 202, hard drive interface 226 and hard drive 232. The video processing unit 218, video encoder 220 or audio processing unit 228 may format or process program data prior to transmission to television 230. One or more peripheral devices, including, but not limited to, television 230, may display the graphical display showing the timer conflict. The user may view the information represented in the graphical display and sends instructions to the satellite set-top-box 200. Again, the peripheral interface 224 may receive the user's instructions. Those instructions may be processed by the control electronics unit 202. Finally, the control electronics 202 may resolve the timer conflict according to the user's instructions.

In FIGS. 3, 4, 5, 6, and 7, different embodiments of the graphical display are described. There is a great variety of different displays possible depending on the capability, components, and operation of the satellite set-top-box 200. For example, embodiments of satellite set-top-boxes can have one tuner allowing the user to record only one program at a time. Other embodiments may have more tuners allowing the user to record several programs simultaneously. In the description that follows, the PVR that created displays in FIG. 3, FIG. 4, FIG. 6 and FIG. 7 have only one tuner. The PVR associated with FIG. 5 has two tuners.

Different embodiments of satellite set-top-boxes may set the timers differently. One embodiment may have a timer that is associated with a channel selector. The term "channel selector" is used herein to describe the circuitry, logic or other components in satellite set-top-box 200 that may assist or command the control electronics unit 202 to select a specific channel. In this embodiment, the timer schedules recordings for its associated channel selector. Satellite set-top-boxes with multiple channel selectors may have a corresponding number of timers. Each timer and channel selector pair may function independently and may schedule one or more records for one or more channels or service providers. A conflict would arise, for example, if the user attempted to record a third program during a time period when a two channel selector satellite set-top-box 200 is already scheduled to record two programs at the same time. Embodiments of satellite set-top-box timers associated with each channel selector are discussed with reference to FIG. 4 and FIG. 5.

In another embodiment satellite set-top-boxes may set timers for each channel. Thus, the satellite set-top-box has a timer associated with every channel received. For example, a satellite set-top-box 200 that receives 500 channels may have 500 timers. In this example, a conflict arises if any two or more timers for any two or more channels try to record a program at the same time and the satellite set-top-box has only one tuner. This case is discussed with reference to FIG. 3 and FIG. 7.

Finally, the satellite set-top-box may set a timer for every program to be recorded. For example, if a user wants to record one program on a channel, the satellite set-top-box will set a timer. If, in this example, the user wants to record another program on the same channel, the satellite set-top-box will create a second timer. Every timer may designate at least a channel and recording time. A conflict may arise, for example, when a user tries to record two programs at the same time, regardless of the channel, on a satellite set-top-box with a single channel selector. This case is discussed with reference to FIG. 6.

One skilled in the art will recognize that different graphical displays are possible depending on the specific embodiment of the satellite set-top-box. The present invention embodies any of these graphical displays regardless of the type. Several embodiments are explained in more detail below.

Figure 3:
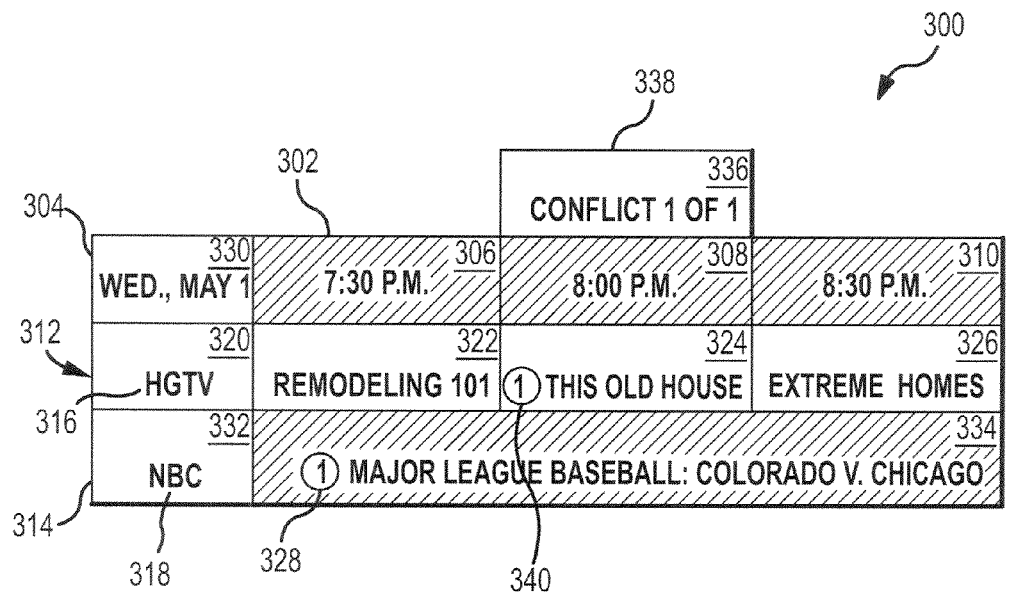
FIG. 3 illustrates one embodiment of a graphical display for timer conflicts.

FIG. 3 shows one embodiment of the graphical display for use with a single channel selector satellite set-top-box. In this embodiment, the graphical display takes the form of a grid 300 or table. The grid 300 is formed in two dimensions along two axes. The grid 300 has a set of columns 302 and rows 304 that are perpendicular to each other and oriented to the two axes. Also, the grid 300 may contain several cells. A cell is a block in the grid 300 that may contain one item of information. One skilled in the art will recognize that the grid 300 need not display an equivalent number of cells for columns 302 or rows 304.

One axis may be the timer axis. The timer axis represents the scheduled time for a program. This timer axis may have a number of columns 302. Each column 302 may have a column header 330, 306, 308, and 310. Each column header 330, 306, 308, and 310 may have unique graphical, textual or stylistic properties that distinguish column headers 330, 306, 308, and 310 from other cells in the grid 300. Examples of graphical, textual or stylistic properties that distinguish column headers 330, 306, 308, and 310 include distinctive icons, shading, or fonts. In this embodiment, column header 306 is for the 7:30 p.m. timeslot, column header 308 is for the 8:00 p.m. timeslot, and column header 310 is for the 8:30 p.m. timeslot. In this embodiment, a timeslot is the position that the program occupies in the sequential order of a programming schedule. Timeslots may have different durations. In this embodiment, columns 302 equate to 30 minute periods of time. Also in this embodiment, the 30 minute duration begins at the time shown in column headers 306, 308 and 310. In the grid 300, column header 330 may represent the date the conflict occurs. In this embodiment, column header 330 shows the date of the conflict as Wednesday, May 1. One skilled in the art will recognize that column header 330 is not limited to displaying the date of the timer conflict. Column header 330 may also display the current date or time, frequency of recording events, advertising, or any other EPG, timer information, or combination thereof. One skilled in the art will recognize that more or fewer columns 302 may be shown in the graphical display, that different timeslots may be shown, and that the timeslots shown need not be in a sequential order.

The other axis may be the event axis. In this embodiment, the event axis represents timer events for the different timers. The event axis may be made up from timer rows 312 and 314. Rows 312 and 314 may have headers 316 and 318 that list the timer identifier. In this embodiment, Timer 1 320 corresponds to the "HGTV" virtual channel and the New Timer 332 corresponds to the "NBC" virtual channel. Each row header 316 and 318 may have unique graphical, textual or stylistic properties that distinguish row headers 316 and 318 from other cells in the grid 300. Examples of graphical, textual or stylistic properties that distinguish row headers 316 and 318 may include distinctive icons, shading, or fonts.

Each timer row 312 and 314 may contain cells with programs listed for the timeslots 306, 308, and 310. For instance, the row for Timer 1 320 contains cell 322 with "Remodeling 101," then cell 324 with "This Old House," and then cell 326 with "Extreme Homes." Timer 1 320 records only "This Old House" in cell 324. However, Timer 1 320 may display more programs than will be recorded. In this embodiment, each timer shows the programs from a specific channel. It is possible that a timer may not record any program in a given timeslot, even if the graphical display shows programs in every timeslot. For this embodiment, cell 322 and cell 326 list programs that will not be recorded and cell 324 lists the program to be recorded. The grid 300 identifies programs that are to be recorded by highlighting the cell (the different shading), by placing a marker 340 (the white circle) in the cell, or by some other distinctive or distinguishing graphical, stylistic or textual properties. The programs listed in cells 322 and 326 precede and succeed the program 324 to be recorded on the channel that these programs are shown. In this embodiment, markers 328 and 340 display a number that corresponds to the associated channel selector. If the satellite set-top-box includes two tuners or channel selectors, for example, then marker 340 may identify the respective channel selector for each record by displaying a "1" or "2." In this embodiment, a timer conflict exists because channel selector "1" can only record one program, either the program in cell 324 or 334, at one time. A person skilled in the art will recognize that different graphical representations or other indicia may be used to indicate whether a program is to be recorded or not. A person skilled in the art will also recognize that different graphical representations or other indicia may be used to correlate markers and tuners for record events.

In the grid 300, the New Timer 332 is set to record a baseball game 334. The graphical length of this timer covers three columns or three timeslots 306, 308, and 310. This graphical length equates to its temporal length, otherwise known as its duration. For the baseball game 334, the graphical length equates to 90 minutes duration. Thus, the program's temporal length is 90 minutes. The durations of the timers may be shown in a linear scale. A person skilled in the art will recognize that the duration of programs occupying the timeslots may be represented by other graphical or temporal scales.

The New Timer 332 and Timer 1 320 are aligned with the event axis, but are placed along the timer axis. Each of the timers is therefore represented as a cell in a row that falls across one or more timeslots. For example, New Timer 332 is placed along the timer axis as one cell 334 in the event axis row 314 and occupies three timeslots 306, 308, and 310.

In this embodiment, the grid 300 displays a Timer Conflict 338 by showing the program 324 to be recorded by Timer 1 320 in the same timeslot 308 as the baseball program 334 to be recorded by the New Timer 332. The conflict may be highlighted further. First, recording timer cell 334 is shown in a different color (the shading of 334). Each recording timer cell 324 and 334 has identical markers 328 and 340 that correspond to the use of the same channel selector "1." Finally, a Conflict Banner 336 is placed above the column where the conflict exists. The Conflict Banner 336 states that the user has one conflict in that timeslot. Thus, with the grid 300, the user may quickly see and understand that he or she is trying to record two programs at 8:00 p.m. when the single channel selector satellite set-top-box can only record one. In addition, the grid 300 provides the user with a user-friendly method for determining how to solve the conflict.

The embodiment in FIG. 3 illustrates the grid 300 in a certain orientation, the timer axis as columns and the event timer axis as rows. Other orientations are possible including displaying the grid with the timer axis as the rows and the event timer axis as the columns. Also, the perpendicular orientation of the axes may be changed. One skilled in the art will recognize that other orientations of the grid 300 are possible.

Figure 4:
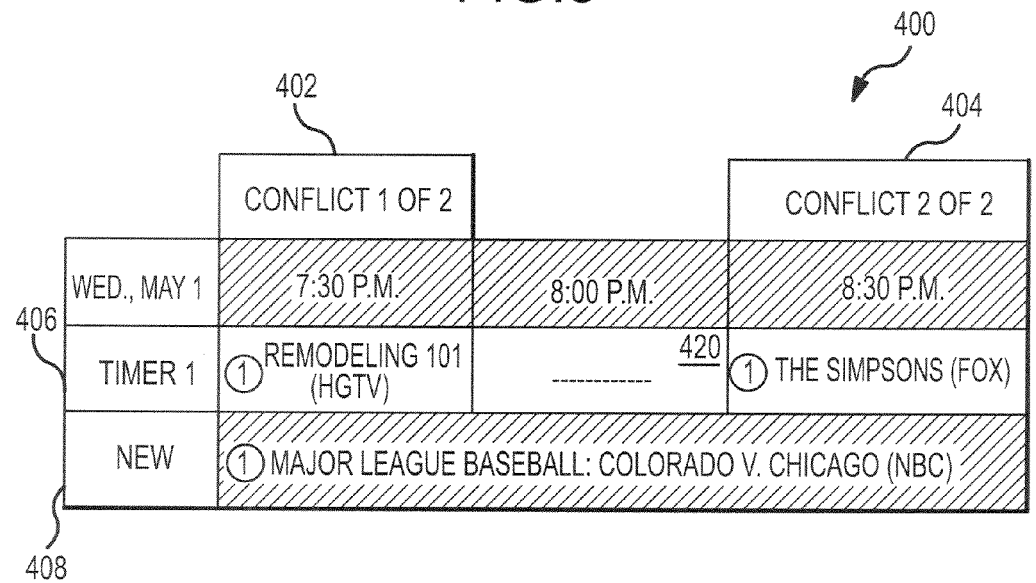
FIG. 4 illustrates a second embodiment of a graphical display for timer conflicts.

FIG. 4 provides another embodiment of the present invention for use with a single channel selector satellite set-top-box. Again, the grid 400 is created with columns and rows. The timeslots in the columns are similar to those in FIG. 3. Also, there are still two timers 406 and 408. This embodiment demonstrates that the graphical display 400 may show two different conflicts simultaneously. The first conflict 402 occurs at 7:30 p.m. The second conflict 404 occurs at 8:30 p.m. This embodiment also shows that conflicts 402 and 404 may be shaded in a different color than other cells in the graphical display 400. Notably, the time cells associated with conflicts 402 and 404 are shaded in the same color to further notify the user of a timer conflict. Also, this embodiment shows that the grid 400 may only display the television programs the timer is scheduled to record. For instance, Timer 1 406 is scheduled to record shows from two different virtual channels during the 7:30 p.m. and 8:30 p.m. timeslots, respectively "Remodeling 101" from the Home and Garden Television (HGTV) virtual channel and "The Simpsons" from the FOX virtual channel. Timer 1 406, however, is not scheduled to record anything during the 8:00 p.m. timeslot. This situation may be represented by the dashes in cell 420. The grid 400 may also not include information about what channel the timer is supposed to record.

Figure 5:
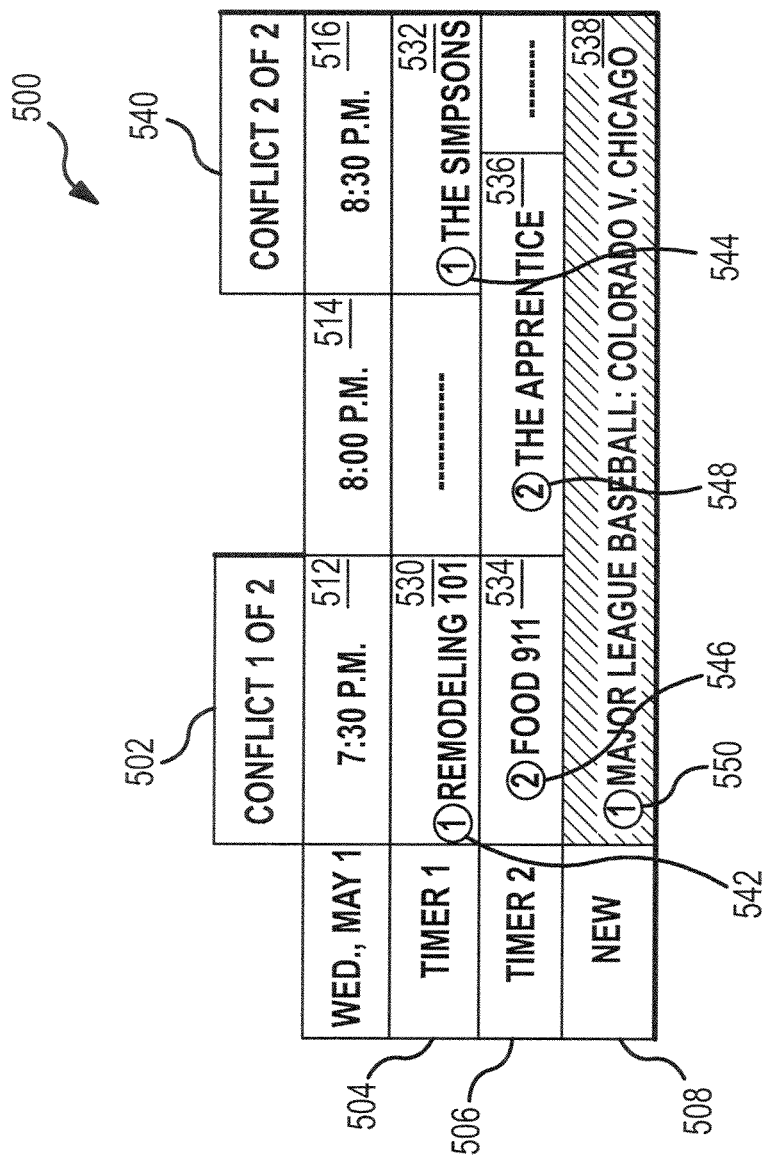
FIG. 5 illustrates a third embodiment of a graphical display for timer conflicts.

FIG. 5 shows another embodiment of the present invention for use with a two channel selector satellite set-top-box. In this embodiment, the grid 500 shows that the satellite set-top-box is scheduled to record two programs simultaneously. This ability is displayed by the two timers 504 and 506 each recording programs at the same time. For instance, Timer 1 504 will record the programs "Remodeling 101" 530 and "The Simpsons" 532 using a first channel selector while Timer 2 506 records the programs "Food 911" 534 and "The Apprentice" 536 using the second channel selector.

The timer conflicts may be highlighted with banners 502 and 540, shading in time cells 512, 514 and 516, shading in program cells 530, 532, 534, 536, and 538, and markers 542, 544, 546, 548 and 550. In this embodiment, the conflict arose when the user attempted to set a New Timer 508 to record the baseball game 538. Two programs 530 and 534 were already set to record during the 7:30 p.m. timeslot 512. Also, two programs 536 and 532 were already set to record during a portion of the 8:30 p.m. timeslot 516. In each case, the satellite set-top-box was commanded to record three programs when it could only record two at one time. One skilled in the art will recognize that the satellite set-top-box may be able to record any number of programs. Also, one skilled in the art will recognize that a timer conflict may arise whenever the user asks the satellite set-top-box to record one more program during a given timeslot than it has capability to do.

The embodiment also shows that unique temporal lengths may be displayed. For instance, the program 536 titled "The Apprentice" has a duration of 45 minutes. Thus, its temporal length of 45 minutes is greater than the duration of one timeslot. To display this difference, the grid 500 shows the program 536 occupying the 8:00 p.m. timeslot 514 and half of the 8:30 p.m. timeslot 516. This display is another example of how the grid 500 graphically may represent a temporal length.

Figure 6:
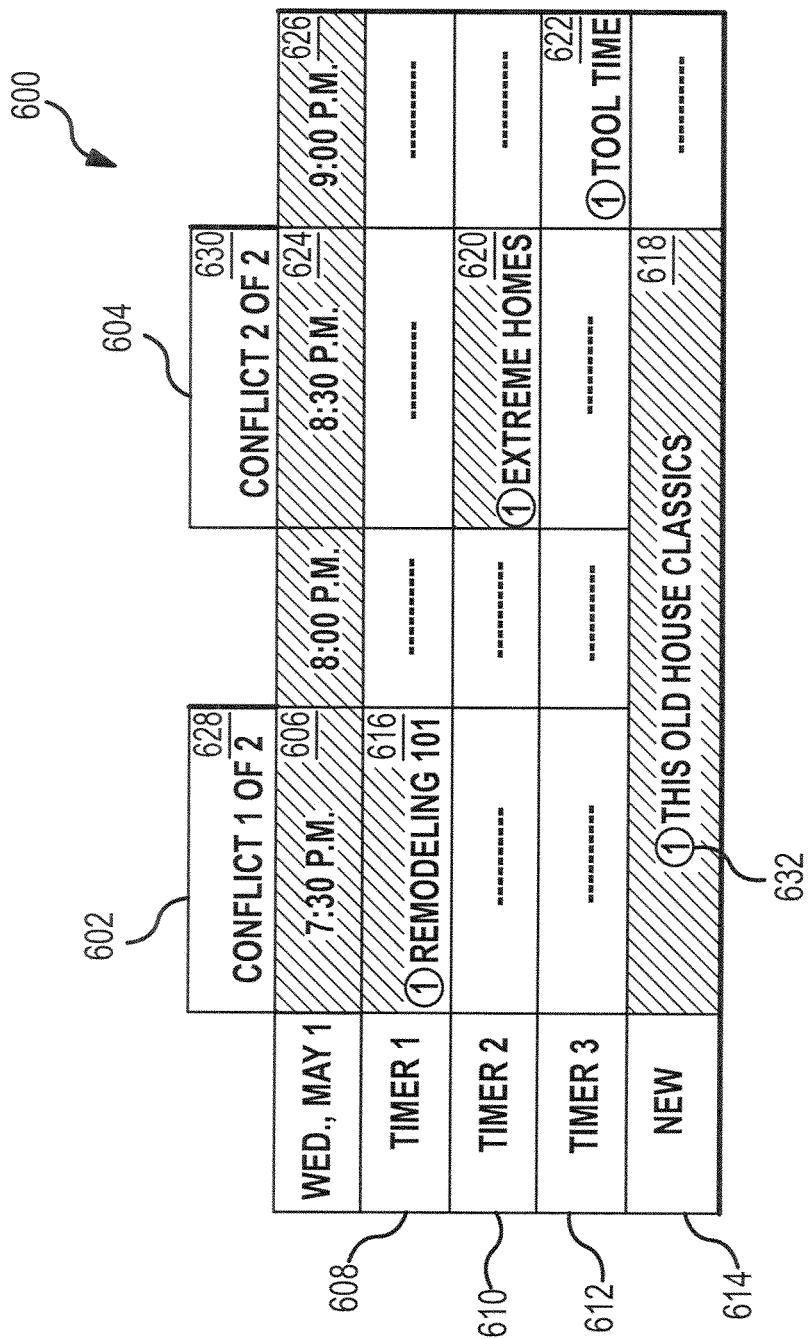
FIG. 6 illustrates a fourth embodiment of a graphical display for timer conflicts.

FIG. 6 shows another embodiment of the present invention. In this embodiment, the satellite set-top-box may record only one program at a time. However, the satellite set-top-box sets a timer 608, 610, 612, and 614 for every record request sent by the user. Four timers 608, 610, 612, and 614 therefore exist to record four different programs 616, 618, 620 and 622 from the same channel or service provider. Two conflicts 602 and 604 occur in this embodiment. Timer 1 608 and the New Timer 614 conflict during the 7:30 p.m. timeslot 606. Timer 2 610 and the New Timer 614 conflict at the 8:30 p.m. timeslot 624. Timer 3 612 does not conflict with any other timer.

To display a conflict, this grid 600 may show that two programs are in the same timeslot. For instance, the television program 616 for timer 1 608 is in the same column for the television program 618 for the new timer 614. Only one program can be in any column. For example, "Tool Time" 622 is the only program in the 9:00 p.m. timeslot 626 and does not conflict with other timers.

Figure 7:
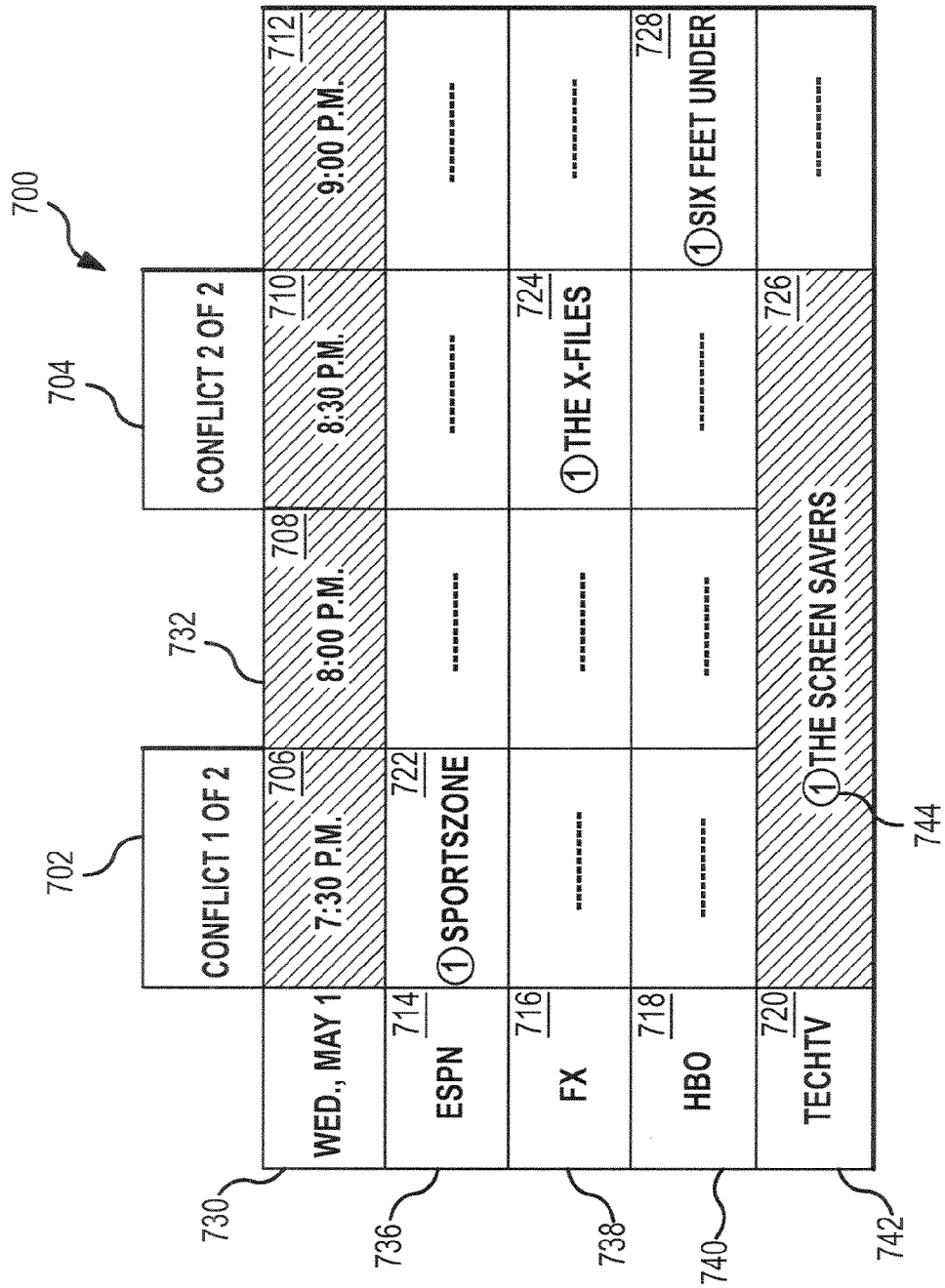
FIG. 7 illustrates a fifth embodiment of a graphical display for timer conflicts.

Again, the conflict may be highlighted with banners 628 and 630, and shading in cells 616, 620, and 618, and markers, like 632, signifying a record for channel selector "1" that is already scheduled to record programs 616 and 620. In this embodiment, the conflict arose when the user attempted to record program 618. The satellite set-top-box was twice commanded to simultaneously record two programs on channel selector "1" when channel selector "1" can only record one program at a time. FIG. 7 shows another embodiment of the graphical display for use with a single or multiple channel selector satellite set-top-box. In this embodiment, the graphical display again takes the form of a grid 700 or table. The grid 700 is formed in two dimensions along two axes. The grid 700 has a set of columns 732 and rows 730 that are perpendicular to each other and oriented to the two axes. One axis is the timer axis. The timer axis represents the scheduled time and duration for a program. This timer axis has a number of columns 732. The other axis is the service provider event axis. The service provider event axis represents the service provider that corresponds to program events displayed in the grid 700. The service provider event axis has a number of rows 736, 738, 740 and 742. The rows 736, 738, 740 and 742 have headers 714, 716, 718 and 720 that identify service providers or channels. In this embodiment, header 714 identifies the service provider "ESPN," header 716 identifies the service provider "FX," header 718 identifies the service provider "HBO," and header 720 identifies the service provider "TechTV." A person skilled in the art will recognize that fewer or more columns and rows may be shown in the graphical display. A person skilled in the art will also recognize that content-providers and timeslots can be shown in any grouping or order, including any combination that is based upon alphabetic, numeric, sequential or thematic criteria. Further, a person skilled in the art will recognize that any graphical or other non-textual representative indicia may be used to identify service providers. Each service provider row 736, 738, 740 and 742 contain cells with an event listed for the timeslots 706, 708, 710 and 712. For instance, row 736 for service provider "ESPN" identifies event 722 as "Sportszone," row 738 for service provider "FX" identifies event 724 as "The X-Files," row 740 for service provider "HBO" identifies event 728 as "Six Feet Under," and row 742 for service provider "TechTV" identifies event 726 as "The Screen Savers."

To display a conflict, grid 700 may show that two programs are in the same timeslot. For example, the "Sportszone" television program 722 for service provider event 736 is in the same column for "The Screen Savers" television program 726 for the new service provider event 742. In this embodiment, only one program can be in any column. For example, the "Six Feet Under" television program 728 is the only program in the 9:00 p.m. timeslot 712 and does not conflict with other timers.

Again, the conflicts may be highlighted with banners 702 and 704, shading in cell 726, and markers, like 744. In this embodiment, the conflict arose when the user attempted to record program 726. The satellite set-top-box was twice commanded to record two programs at the same time when it could only record one.

Figure 8:
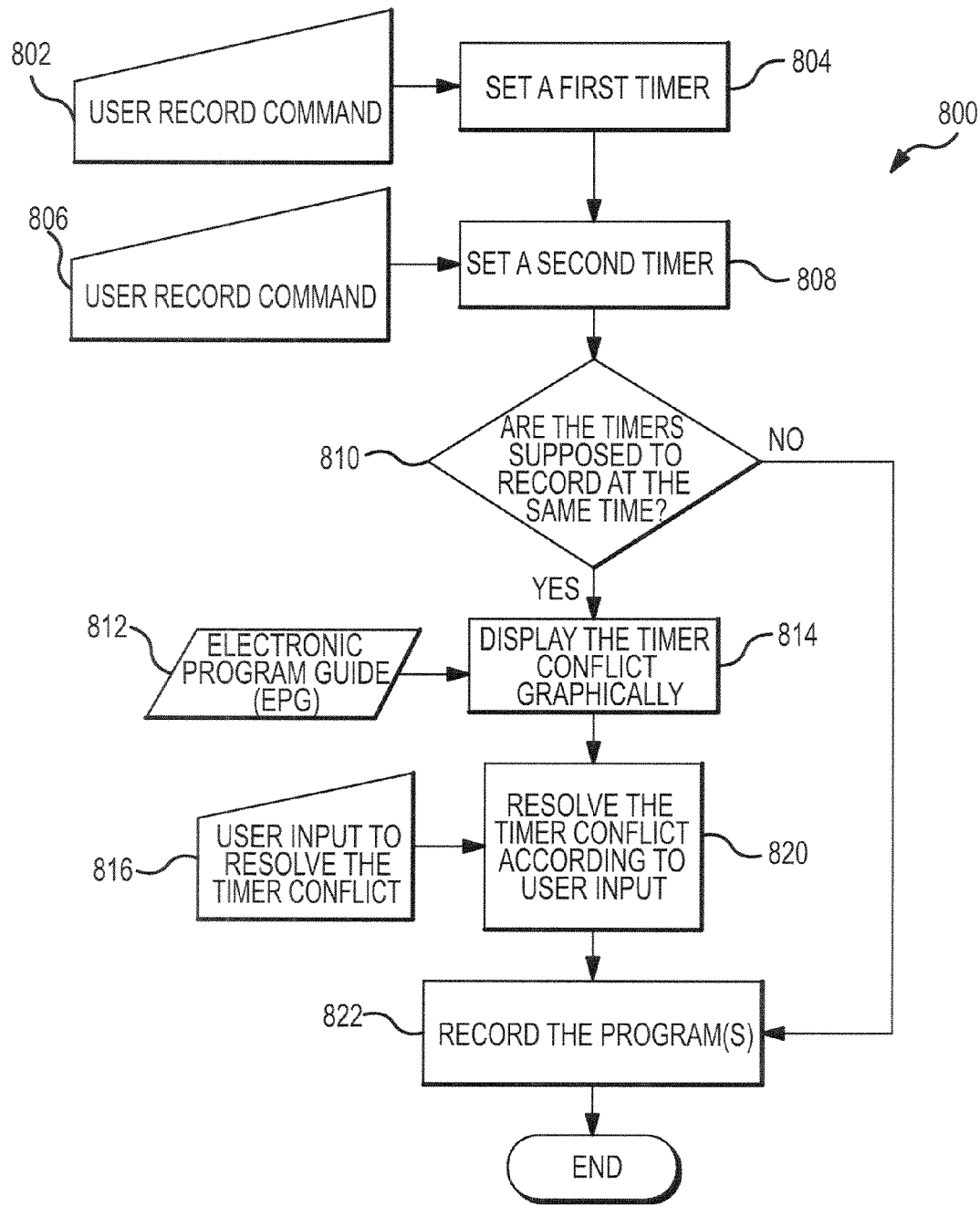
FIG. 8 illustrates the logical steps of one embodiment of a method for graphically displaying and resolving timer conflicts.

FIG. 8 shows an embodiment of the method 800 to display a timer conflict for a satellite set-top-box. In this embodiment, the user may send a first record command 802. The satellite set-top-box may set a first timer 804 in response to the user's instructions. The user may then send a second record command 806. The satellite set-top-box may set a second timer 808 in response to the user's instructions. In this example, the satellite set-top-box has two timers set to record. One skilled in the art will recognize that a satellite set-top-box may be able to set any number of timers.

The satellite set-top-box 200 may now check 810 for conflicts between Timer 1 804 and Timer 2 808. The checking for conflicts may require the satellite set-top-box to determine if the timers must record at the same time. Recording at the same time may mean starting a record at the same time or starting a second record before another record stops. In one embodiment (not shown) the checking 810 for a conflict may involve checking the time the user set for Timer 1 804 and Timer 2 808, after which flow continues to the graphical display 814 of conflicts, if any. In another embodiment, the satellite set-top-box may retrieve EPG data to determine if the scheduled time set for the program is the same for the two programs. In yet another embodiment, the satellite set-top-box may repeatedly check the EPG data to check for conflicts that may occur due to changes in EPG information. If a television program runs past its normal time, the satellite set-top-box can inform the user of a conflict with another timer set to start after that program ends.

In another embodiment, one of the timers may involve a repeating timer. For example, the satellite set-top-box may need to record the same program repeatedly on some set schedule, like recording ABC every Sunday at 8:00 p.m. if one of the timers is a repeating timer, the satellite set-top-box may check one or more instances of the repeating timer to find a timer conflict. One skilled in the art will recognize that other techniques for identifying timer conflicts are possible and within the scope of this invention.

To construct the graphical display, the satellite set-top-box may use EPG information. This may include retrieving EPG data 812 to obtain the scheduled time set for the program is the same for the two programs. EPG information may help display the timer conflict with data about the channels on which the television programs will play. For instance, the graphical display may show what television programs are playing before and after the program to be recorded. Also, the EPG information may allow the graphical display to show what channel the programs are on or any changes with those programs. In another embodiment, the graphical display may show only that information stored with the timers. Thus, the display may not show the channel or what is happening on before or after the recording. The display may take other forms. One skilled in the art will recognize that EPG information may be used for a number of different types of displays.

Figure 10:
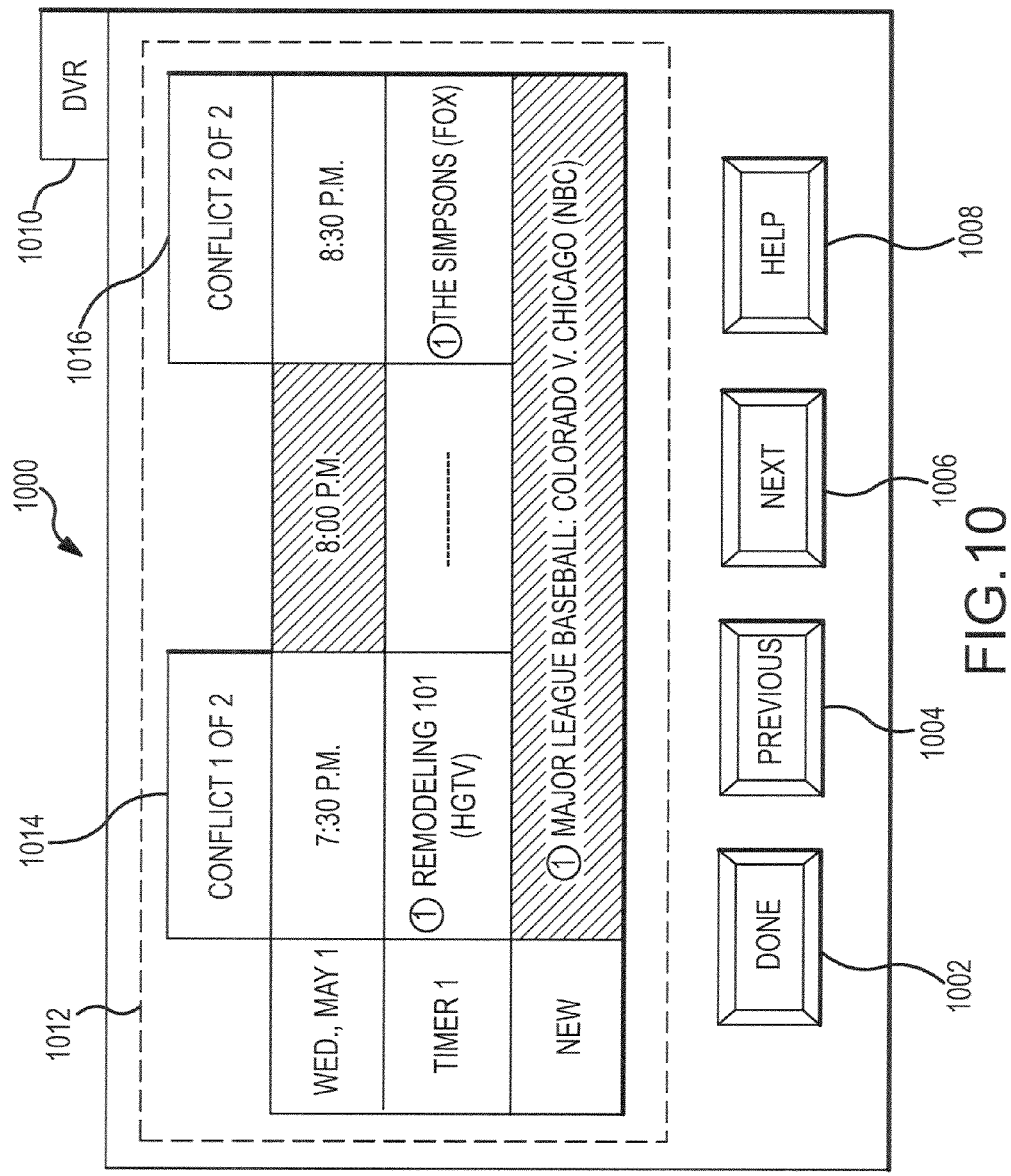
FIG. 10 illustrates one embodiment of a graphical user interface for notifying a user of a timer conflict.

If there is no conflict, the satellite set-top-box 200 may record the programs 822 according to the timers. If the satellite set-top-box 200 determines that a conflict exists, the satellite set-top-box 200 may then display 814 the timer conflict graphically. FIG. 10 shows one embodiment of a pop-up window or Timer Conflict Notification Window 1000 that requests user input to select and resolve each timer conflict. In this embodiment, the delivery device 208 creates a Timer Conflict Notification Window 1000 that identifies and presents timer conflicts using the graphical display 1012 previously described and embodied in FIG. 4. The Timer Conflict Notification Window 1000 may contain buttons or other graphical components for user input. One skilled in the art will recognize that other graphical-user-interfaces or man-machine interfaces for selecting a timer conflict may be possible. In this embodiment, buttons 1002, 1004, 1006, and 1008 correspond to commands that may assist the user to select the identified timer conflicts. For example, the Timer Conflict Notification Window 1000 of this embodiment presents a graphical display 1012 that shows two timer conflicts, Conflict 1 1014 and Conflict 2 1016. In this embodiment, the user may navigate and select Conflict 1 1014 or Conflict 2 1016 individually or by using the "PREVIOUS" button 1004 or the "NEXT" button 1006. One skilled in the art will recognize that other ways of navigating through the graphical display 1012 and Timer Conflict Notification Window 1000 are possible. A "HELP" button 1008 may be provided for users who need help understanding timer conflicts. A "DONE" button 1002 may also be provided to allow users to indicate that all timer conflicts are resolved. One skilled in the art will recognize that many user commands that are helpful for selecting timer conflicts may be possible. Further, one skilled in the art will also recognize that the user interaction with the graphical display may be manual (e.g., selecting a button, program, or timer conflict), automatic (e.g., automatically exiting the Timer Conflict Notification Window 1000, after resolving conflicting timers, without selecting the "DONE" button 1002), or by any combination thereof. Finally, the Timer Conflict Notification Window 1000 may provide status information helpful for resolution of conflicting timers. In this embodiment, status box 1010 notifies the user that the selected program record event corresponds to a record function on a DVR. One skilled in the art will recognize that the display of other information may be possible. For example, displayed information may also include an indication of whether a selected program corresponds to an automated viewing or any other type of reminder. Displayed information may also include an indication of what device or devices will record the selected program.

Once displayed the satellite set-top-box 200 may accept user input 816 to help resolve the conflict. The user input 816 may include instructions to delete one of the timers, to edit when one of the timers records, or to skip an instance of a record for a repeating timer. One skilled in the art will recognize that other user input 816 is possible.

Figure 9:
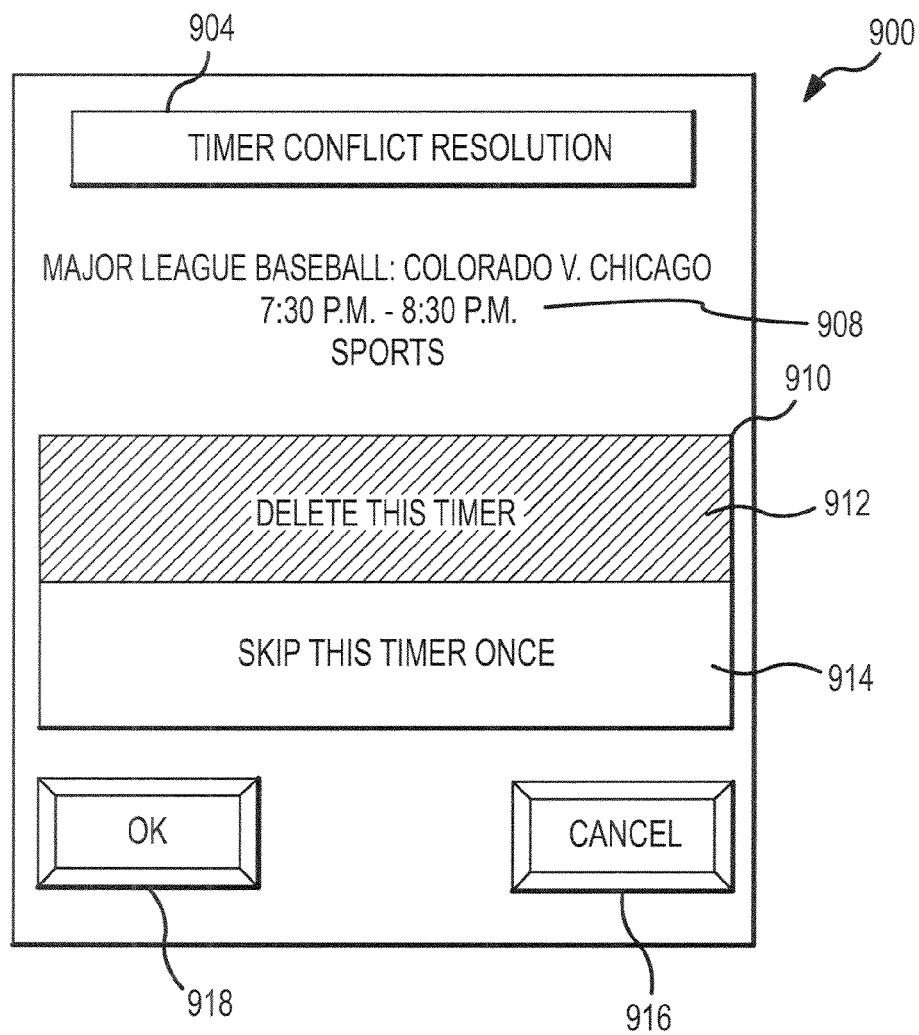
FIG. 9 illustrates one embodiment of a graphical display for receiving user input to resolve a timer conflict.

FIG. 9 shows one embodiment of the graphical display to help users resolve the timer conflict. In this embodiment, the graphical display takes the form of a pop-up window or Timer Conflict Resolution Window 900 that requires user input 816. In this embodiment, the Timer Conflict Resolution Window 900 includes a banner 904 acknowledging the presence of a timer conflict. The Timer Conflict Resolution Window 900 may also set forth the program data 908 associated with the conflicting timer. In this embodiment, the user is presented with two selections 910 for how to resolve the timer conflict. The first selection 912 allows the user to delete the conflicting timer. Alternatively, the second selection 914 allows the user to skip the conflicting timer during the conflicting time period identified by the program data 908. Once the user makes a selection 912, the user may then confirm the selection by pressing an "OK" button 918 or cancel the resolution of the timer conflict by pressing a "CANCEL" button 916. One skilled in the art will recognize that other ways of resolving timer conflicts are possible.

The satellite set-top-box 200 may then resolve the timer conflict 820 according to the user input. Resolving the conflict 820 may take different forms. If the user selects to delete the second timer, the satellite set-top-box may not finish the creation of the timer as opposed to creating the timer then deleting the timer. This process may delete the timer. One skilled in the art will recognize that the satellite set-top-box 200 may utilize different processes to follow the user's instructions. The user may determine to edit when one of the timers records. For instance, the user could instruct to start the second timer 30 minutes late to allow the first timer to finish. In addition, the user may decide to skip an instance of a record for a repeating timer. In other words, the user may instruct satellite set-top-box 200 to not record ABC at 8:00 p.m. this Sunday, but resume any remaining or recurring records for that timer after this Sunday. The satellite set-top-box 200 may execute these timer-resolution instructions. After the resolution of the timer conflict, the satellite set-top-box 200 may then record 822 the program or programs according to the changed timer or timers. One skilled in the art will recognize that other ways of processing timer conflict resolution instructions are possible.

What is claimed:

1. A recording device comprising:
a plurality of tuners, each tuner configured to receive a different program for recording;
a storage device configured to store recorded programs; and
a processor in communication with the tuners and the storage device to receive and record the different programs, wherein the processor is configured to:
output a timer conflict display comprising a two dimensional grid of cells having a time axis representing particular show times and a tuner axis representing each of the plurality of tuners, wherein each of the different programs to be received by each tuner is presented on the tuner axis associated with that tuner at its particular show time so that all of the programs to be recorded at the particular show times are simultaneously presented on a common display;
output a representation of a first timer on the timer conflict display for a first program to received by a first one of the plurality of tuners within the two dimensional grid of cells, the representation of the first timer having a first graphical length along the time axis corresponding to a first temporal length of the first program to be recorded; and
output a representation of a second timer on the timer conflict display for a second program to be received by a second one of the plurality of tuners within the two dimensional grid of cells, the representation of the second timer having a second graphical length along the time axis corresponding to a second temporal length of the second program to be recorded;
the first timer and the second timer extending along at least a same portion of the time axis, illustrating a recording conflict between the first and second timers;
wherein the first program is associated with first packets and the second program is associated with second packets, and wherein the processor is further configured to:
identify that the first and second packets are multiplexed on a common carrier frequency;
responsive to identifying that the first program and the second program are transmitted on the common carrier frequency, control the recording of the first and second packets by the storage device;
reassemble the first packets related to the first program into a first data stream; and
reassemble the second packets related to the second program into a second data stream.

2. The recording device of claim 1, wherein the timer conflict display presents only those programs that have been selected for recording.

3. The recording device of claim 1, wherein the processor is further configured to receive user input requesting to resolve the recording conflict and to delete the second timer responsive to the user input.

4. The recording device of claim 1, wherein the second timer comprises an instance of a recurring timer and the processor is further configured to automatically skip the instance of the repeating timer responsive to the user input.

5. The recording device of claim 3, wherein the processor is configured to edit a duration of the second timer responsive to the user input such that the first timer and the second timer are no longer in conflict.

6. The recording device of claim 1, wherein the timer conflict display comprises programs simultaneously broadcast on non-contiguous channels.

7. The recording device of claim 1, wherein the second timer is associated with a recurring timer and wherein the processor is further configured to determine whether the second program to be recorded requires the same tuner as the first program to be recorded responsive to downloading updated electronic programming guide data.

8. The recording device of claim 1, wherein the processor is further configured to output a banner conflict indicator along a portion of the time axis associated with the overlap between the first timer and the second timer.

9. The recording device of claim 1, wherein the storage device is further configured to store information regarding a third program to be recorded using the channel selecting resource, the first program being broadcast at a different time than the second program, the processor further configured to determine whether the second program to be recorded requires the same tuner as the third program to be recorded and wherein the recording device is configured to graphically output a second recording conflict between the second and third programs in the grid.

10. The recording device of claim 1, wherein the processor is configured to output a visual indicia associated with the representation of the second timer, the visual indicia indicating that the second program will not be recorded.

11. The recording device of claim 1 wherein the two dimensional grid of cells is presented such that timers to be recorded on the first tuner are presented on a first tuner axis and programs to be recorded on the second tuner are presented on a second tuner axis regardless of the channels on which the programs represented by timers are received.

12. The recording device of claim 11, wherein the processor is configured to receive user input requesting to resolve the recording conflict by responsively moving recording of one of first and second programs to a different one of the first and second tuners.

13. The recording device of claim 11, wherein the processor is configured to receive user input requesting to resolve the recording conflict and responsively delete the second timer.

14. The recording device of claim 11, wherein the processor is configured to receive user input requesting to resolve the recording conflict and responsively edit the duration of the first timer to accommodate the second timer using the second tuner.

15. The recording device of claim 11, wherein the processor is configured to edit a duration of the second timer responsive to the user input such that the first timer and the second timer are no longer in conflict.

16. The recording device of claim 11, wherein the second timer comprises an instance of a recurring timer and the processor is configured to skip the instance of the recurring timer responsive to user input requesting to resolve the recording conflict.

17. The recording device claim 1, wherein the processor is further configured to receive a user input requesting to view the second program and output the second program responsive to the user input.

18. The recording device claim 1, wherein the processor is configured to control the recording of the first and second packets to an external storage device.

19. The recording device of claim 1 wherein the processor is configured to reassemble the first and second data streams by placing the first packets together in a first contiguous data stream and the second packets together in a second contiguous data stream.

* * * * *